W. R. CAMPBELL.
APPARATUS FOR DRAWING GLASS CYLINDERS.
APPLICATION FILED DEC. 15, 1913.
1,122,477.
Patented Dec. 29, 1914.
2 SHEETS—SHEET 1.
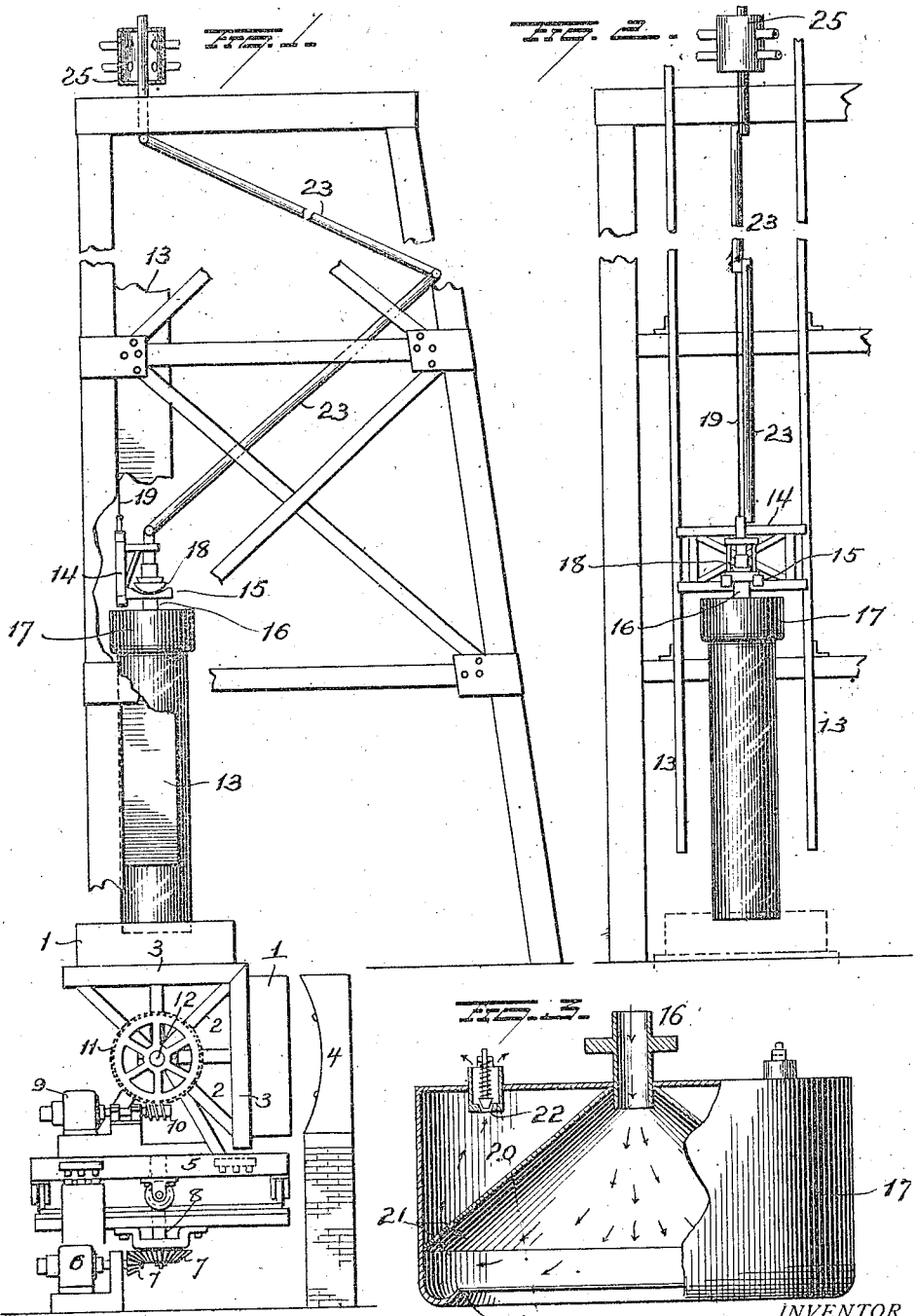
WITNESSES
E. L. Nottingham
G. F. Downing
INVENTOR
W. R. Campbell
By H. A. Seymour
Attorney

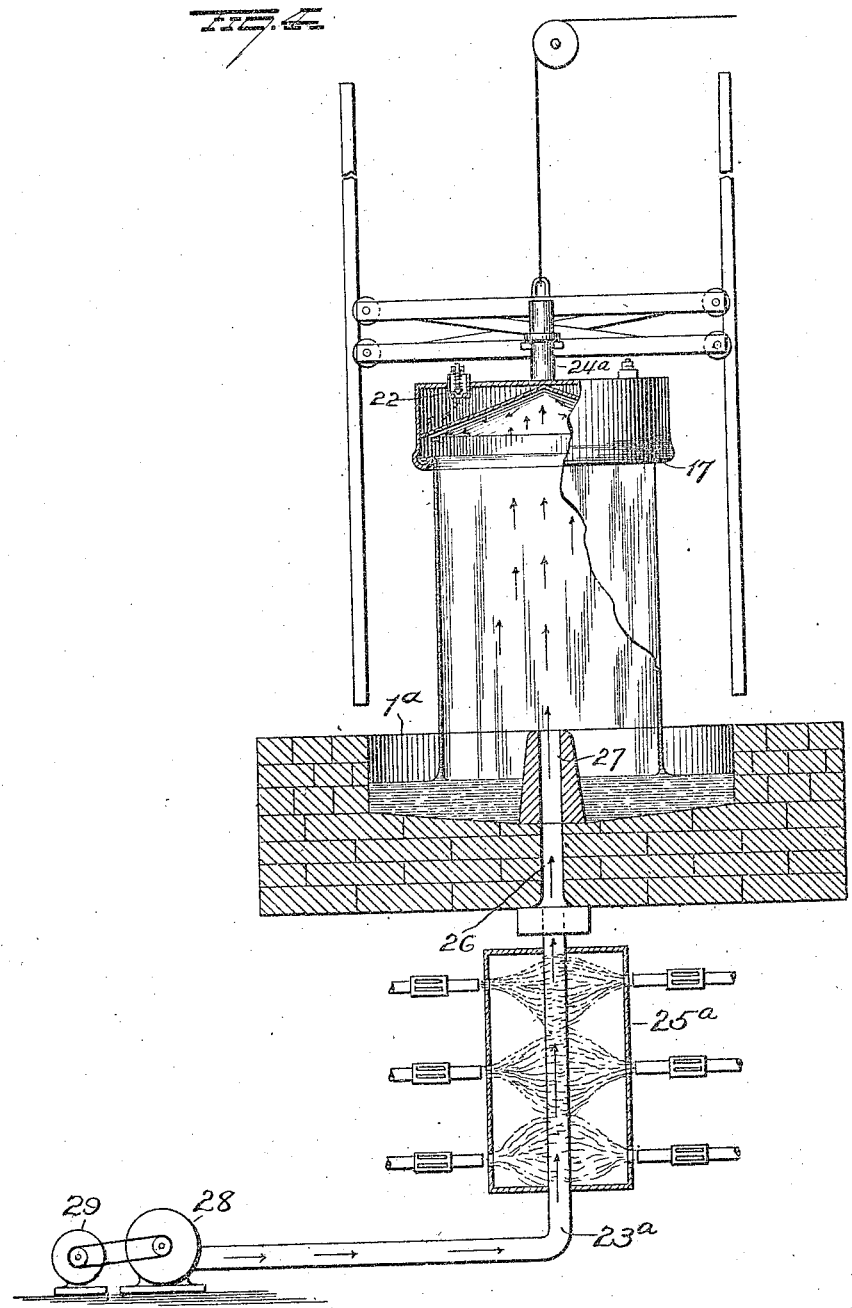

UNITED STATES PATENT OFFICE.

WILLIAM R. CAMPBELL, OF LANCASTER, OHIO.

APPARATUS FOR DRAWING GLASS CYLINDERS.

1,122,477.  Specification of Letters Patent. Patented Dec. 29, 1914.

Application filed December 15, 1913. Serial No. 806,870.

*To all whom it may concern:*

Be it known that I, WILLIAM R. CAMPBELL, of Lancaster, in the county of Fairfield and State of Ohio, have invented certain new and useful Improvements in Apparatus for Drawing Glass Cylinders; and I do hereby declare the following to be a full, clear, and exact description of the invention, such as will enable others skilled in the art to which is appertains to make and use the same.

My invention relates to an improvement in apparatus for drawing glass cylinders, and more particularly to the drawing tool or bait, the object being to provide means for maintaining that portion of the glass cylinder that is in contact with the drawing tool, sufficiently heated during the entire drawing operation, to prevent it from cracking or breaking away from said tool.

With this object in view, my invention consists in the parts and combination of parts and in the details of construction as will be more fully described and pointed out in the claims.

In the accompanying drawings, Figure 1 is a view in side elevation of a glass drawing apparatus embodying my invention; Fig. 2 is an end view of same; Fig. 3 is a view partly in section and partly in elevation of the bait detached and Fig. 4 is a view partly in section and partly in elevation of a glass drawing apparatus showing the parts adapted for a bottom blow.

1 represents the receptacle from which the cylinder is drawn. This receptacle may be a pot from which the glass flows from the tank, or into which the glass is ladled from the tank, or a forehearth, or dog house or extension from the tank itself, hence by the term pot, I intend to include any receptacle for the glass. For the purpose of illustration however, I have shown my improvement in connection with a tilting pot construction which is disclosed in my pending application No. 792,150 filed by me September 27th, 1913. This construction comprises two pots 1, carried by a tilting frame 2, the latter having tables 3 located end to end and at an angle of ninety degrees on which the pots 1 are carried, so that when one pot is in a horizontal position under the drawing apparatus, the other pot will be in a vertical position adjacent to a furnace 4, the heat from which melts the surplus glass remaining after the drawing operation, and permits it to drain into a suitable receptacle located below the pot. The tilting frame 2, is mounted on the turn table 5, which is rotated by the motor 6, gearing 7 and shaft 8, and the tables 3 with the pots thereon, are turned by the motor 9 and worm 10 and worm wheel 11, the worm wheel 11, being secured to the shaft 12 to which the table frames 2 are secured. By rotating the turn table one-half revolution, and giving to the shaft 12 a quarter turn, the pot 1, which is shown in a vertical position, will be turned to a horizontal position ready to receive a batch of glass, and the horizontal pot will be turned to a vertical position in front of the furnace.

Located over the pot 1, are the vertical guides 13 for the cage 14, the latter having a slotted seat 15, in which the stem 16 of the drawing tool 17 rests, the said stem having a collar 18 resting on the seat; the cage is moved vertically by the cable 19 connected with a suitable motor, and as it moves, either up or down, it carries with it the tool or bait 17.

The drawing tool or bait 17 shown in detail in Figs. 3 and 4, is in the form of an inverted hollow cylindrical receptacle provided at its lower open end with an inwardly projecting flange 19, shaped to form an annular groove or gutter around the entire lower edge of the tool, so that when the tool is lowered into the molten glass, the latter will run into the said groove or gutter, and adhere thereto so that when the cage with the bait carried thereby is elevated, the glass will be drawn up into the form of a cylinder in the well known manner.

Located within the hollow receptacle 17, is the conical deflector 20, the diameter of which conforms to the internal diameter of the receptacle. This deflector may stop short of the side walls of the receptacle, or it may be notched or perforated adjacent said side walls as shown at 21, so that the heated air passing through or filling the cylinder will be deflected by the deflector 20 and caused to come into close contact with the upper end of cylinder, and maintain the latter at such temperature that all danger of fracture due to chilling will be entirely eliminated. The heated air is thus all deflected toward the sides of the deflector, and passes over and into contact with the upper edge of the cylinder, and from thence up into the chamber above the deflector, and any excess over a predetermined pressure escapes through the valves 22 in the top of the drawing tool. The air pressure is regulated by these valves to maintain the cylinder at its proper diameter, hence any reduction in pressure below normal, would be followed instantly by the complete closure of all the valves. As the air is heated when it enters the cylinder, and is further heated by the hot glass of the cylinder, it will be seen that it operates to keep the glass of the cylinder, throughout the length of the latter, sufficiently hot to prevent chilling sufficient to cause undue contraction.

In the construction shown in Figs. 1, 2 and 3, the air is carried by a flexible or jointed pipe 23, to the hollow stem 16 in the top of the drawing tool or bait, and when the top blow is used, I heat the air in said pipe by means of a furnace 25, shown in Fig. 1, the furnace embracing a section of the air pipe intermediate the blower or storage tank, and the jointed section 23 of the pipe.

In Fig. 4 I have shown my improved bait in connection with a bottom blow. With this latter construction, the pot 1ª is provided with a central duct 26, and 27 is a refractory block located within the pot and provided with a duct which forms a continuation of the duct 26, and terminates above the level of the glass in the pot. The lower end of the duct 26, is in communication with an air pipe 23ª, which leads from a blower or fan 28 actuated by a motor 29, and through a furnace or heating chamber 25ª, before entering the pot, so that the air as it enters the cylinder being drawn will be highly heated. With this construction the stem 24ª of the bait 17 is solid instead of hollow, as in the other construction.

With the top blow construction the air enters the cylinder through the bait, the surplus, after the necessary pressure has been attained, passing out through the valves 22. With the bottom blow construction shown in Fig. 4, all the air passes upwardly through the cylinder, the excess, after the necessary pressure has been attained, passing out through the valve.

It is evident that many slight changes might be resorted to in the relative arrangement of parts shown and described without departing from the spirit and scope of my invention. Hence I would have it understood that I do not wish to confine myself to the exact construction and arrangement of parts shown and described, but Having fully described my invention what I claim as new and desire to secure by Letters-Patent, is:—

1. A glass drawing tool provided with an inwardly turned flange at its lower end, and a deflector located within the tool in a plane above the inwardly turned flange of the latter, for deflecting the hot air over said flange.

2. A glass drawing tool closed at its top and open at its bottom and provided at its lower open end with an internal annular groove, a deflector within the tool and above said groove for deflecting the hot air toward the latter, and a valve in the top of the tool above the deflector.

3. A glass drawing tool comprising a cylindrical body open at its lower end and provided at said open end with an internal annular groove or gutter, a conical deflector within said body and in a plane above the groove for deflecting the hot air toward said groove, and a valve in the top of the body above the deflector.

4. A drawing tool comprising a cylindrical body open at its lower end and provided at said open end with an internal annular groove or gutter, a deflector within said body and in a plane above the internal groove for deflecting the hot air toward said groove or gutter, a valve in the body of the tool above the deflector, an air pipe for supplying air to the cylinder drawn by the drawing tool and means for heating the air before it enters the cylinder.

5. A drawing tool comprising a cylindrical body closed at the top and open at its lower end, and provided at its open end with an internal annular groove or gutter a deflector within said body and in a plane above the internal groove for deflecting the hot air toward said groove or gutter, a pipe leading into said tool for supplying air to the cylinder being drawn, and a valve in the body of the tool above the deflector.

6. The combination of a drawing tool provided with an inwardly turned flange at its lower end, a deflector for deflecting the hot air over the flange, a pipe for supplying hot air to the cylinder being drawn by the tool and means for heating the air before it enters the cylinder.

In testimony whereof, I have signed this specification in the presence of two subscribing witnesses.

WILLIAM R. CAMPBELL.

Witnesses:
T. T. COURTRIGHT.
R. H. WOLFE.